United States Patent [19]

Petrie

[11] Patent Number: 4,487,183
[45] Date of Patent: Dec. 11, 1984

[54] SPEED DEPENDENT IGNITION CONTROLLER AND METHOD

[75] Inventor: Adelore F. Petrie, Arlington Heights, Ill.

[73] Assignee: Motorola, Inc., Schaumburg, Ill.

[21] Appl. No.: 488,945

[22] Filed: Apr. 27, 1983

[51] Int. Cl.³ ............................................. F02P 5/04
[52] U.S. Cl. .................................. 123/418; 123/609
[58] Field of Search ............................. 123/418, 609

[56] References Cited

U.S. PATENT DOCUMENTS

| | | | |
|---|---|---|---|
| 3,791,356 | 2/1974 | Saita | 123/618 |
| 4,033,272 | 7/1975 | Henrich | 123/618 |
| 4,079,709 | 3/1976 | Schuette | 123/418 |
| 4,079,909 | 3/1976 | Schuette | 123/618 |
| 4,085,714 | 3/1976 | Hattori et al. | 123/618 |
| 4,095,576 | 9/1976 | Hattori | 123/618 |
| 4,104,997 | 1/1976 | Padgitt | 123/618 |
| 4,133,325 | 9/1977 | West | 123/618 |
| 4,138,982 | 2/1979 | Hattori et al. | 123/618 |
| 4,201,163 | 1/1977 | Hattori et al. | 123/618 |
| 4,236,214 | 1/1978 | Sasayama | 123/618 |
| 4,245,600 | 1/1981 | Katada | 123/418 |
| 4,261,312 | 9/1979 | Hart | 123/618 |
| 4,276,860 | 7/1981 | Capurka | 123/609 |
| 4,284,046 | 8/1981 | Hashimoto | 123/418 |
| 4,326,486 | 4/1982 | Mezger | 123/418 |
| 4,444,171 | 4/1984 | Baxter | 123/418 |

Primary Examiner—Ronald B. Cox
Attorney, Agent, or Firm—James W. Gillman; William J. Kubida; Phillip H. Melamed

[57] ABSTRACT

A speed-dependent ignition controller and method utilizes a sensor output signal to provide spark occurrence and dwell initiation at retard and advance angles for an internal combustion engine. The sensor signal has a pulse width proportional to the difference between a desired ignition advance and retard angle. At low rpm, the sensor signal is inverted to produce a retarded ignition angle while at high rpm's the signal is utilized without inversion to produce an advance ignition angle.

20 Claims, 4 Drawing Figures

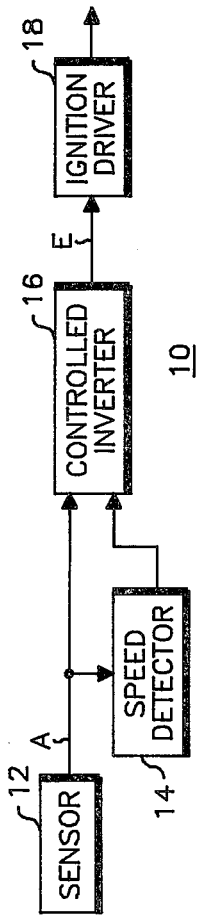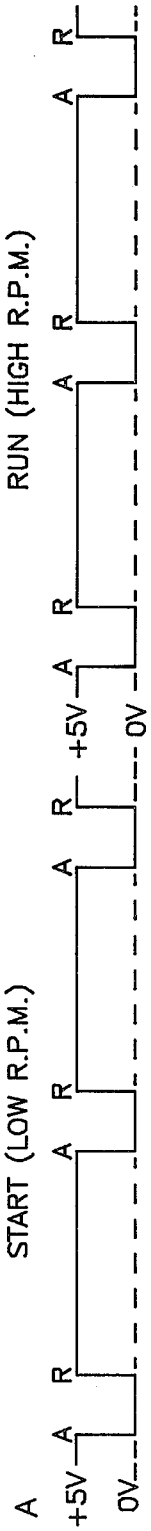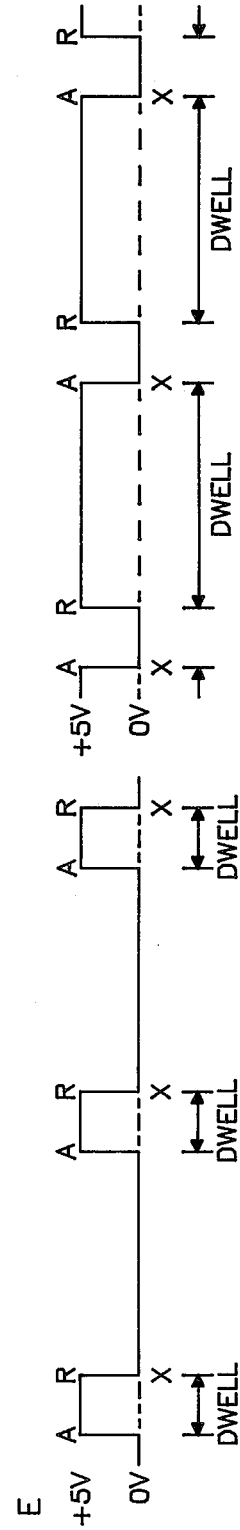
Fig. 1A
Fig. 1B
A=ADVANCE ANGLE  R=RETARD ANGLE  X=SPARK OCCURRENCE

SPEED DEPENDENT IGNITION CONTROLLER AND METHOD

BACKGROUND OF THE INVENTION

The present invention relates, in general, to ignition controllers and methods for use with internal combustion engines. More particularly, the speed dependent ignition controller and method of the present invention is of especial utility for providing an engine speed variable dwell control signal for terminating dwell and implementing retard and advance of ignition timing useful in the startup and sustained running of internal combustion engines.

During startup and at other times of generally low engine speed, it is of course desirable to retard the ignition of the air/fuel mixture in an internal combustion engine so as to avoid the kickback caused by ignition of the air/fuel mixture before the piston reaches top dead center. Conversely, at higher engine speeds, ignition is commenced before the piston reaches top dead center, which, due to the finite time span involved in fully igniting the mixture, will result in a desired power stroke after passage of the top dead center position.

In either instance, whether at a retard or advance ignition position, spark occurrence is initiated after a specific dwell time; dwell time being that finite length of time during which current is available to charge the ignition coil to fire the spark plug. At slow engine speeds this finite length of time required to charge the coil corresponds to a relatively small angular displacement of the engine crankshaft and therefore relates to a small dwell angle. At higher engine speeds on the other hand, a greater dwell angle corresponds to the same dwell time and therefore dwell initiation must occur earlier.

To this end, there have previously been disclosed numerous mechanical spark occurrence advance mechanisms for centrifugal or vacuum switching between a fixed retard and advance angle for use with simple engine ignition systems, and similar mechanical dwell control mechanisms were utilized. More recently, numerous electronic circuits have been proposed which have, to some extent, eliminated many of the problems and costs inherent in the earlier mechanical systems. However, these electronic systems have themselves been relatively complex, requiring numerous individual components or sensors and therefore themselves somewhat costly to produce and concomitantly prone to failure by virtue of the number of components involved.

It is therefore an object of the present invention to provide an improved speed dependent ignition controller and method.

It is further an object of the present invention to provide an improved speed dependent ignition controller and method which is readily and inexpensively implemented.

It is still further an object of the present invention to provide an improved speed dependent ignition controller and method which simplifies the establishment of spark retard for starting and spark advance for sustained run speeds.

It is still further an object of the present invention to provide an improved speed dependent ignition controller and method which provides selective utilization of a single engine sensor having as an output a signal having a pulse width proportional to the difference between a desired ignition advance and retard angle.

SUMMARY OF THE INVENTION

The foregoing and other objects are achieved in the present invention wherein there is provided an internal combustion engine ignition controller and method for controlling the ignition timing of such, comprising a sensor coupled to the engine for generating a sensor signal having a pulse width proportional to the difference between a desired ignition advance and retard angle. An engine speed detector is coupled to the sensor for developing first and second threshold signals when the sensor signal is representative of an engine speed less than and greater than a threshold engine speed respectively. A speed dependent signal inverter is coupled the sensor and the engine speed detector for producing a dwell control signal by selectively inverting the sensor signal in response to the first and second threshold signals, the dwell control signal adaptable for controlling the initiation of at least one of dwell and spark, whereby the dwell control signal ends at the retard angle when the first threshold signal is present and ends at the advance angle when the second threshold signal is present.

In accordance with the invention, a method for controlling the ignition timing of an internal combustion engine in relation to engine speed is provided which comprises the steps of generating a sensor signal having a pulse width proportional to the difference between first and second ignition angles. The sensor signal is utilized to produce a first dwell control signal when the engine speed bears a first relation to a predetermined threshold engine speed and inverts the sensor signal to produce a second dwell control signal when the engine speed bears a second opposite relation to the predetermined threshold engine speed.

BRIEF DESCRIPTION OF THE DRAWINGS

The above mentioned and other features and objects of the invention and the manner of attaining them will become more apparent and the invention itself will be best understood by reference to the following description of an embodiment of the invention taken in conjunction with the accompanying drawings, wherein:

FIG. 1A is a simplified block diagram of a speed dependent ignition controller in accordance with the present invention;

FIG. 1B is a relative timing diagram in relation to crankshaft angle for a speed dependent ignition controller in accordance with the present invention illustrating the sensor output signal having a pulse width proportional to the difference between a desired ignition advance and retard angle and its selective utilization as a dwell control signal in both low and high rpm modes of operations;

DESCRIPTION OF A PREFERRED EMBODIMENT

Figure 2A:
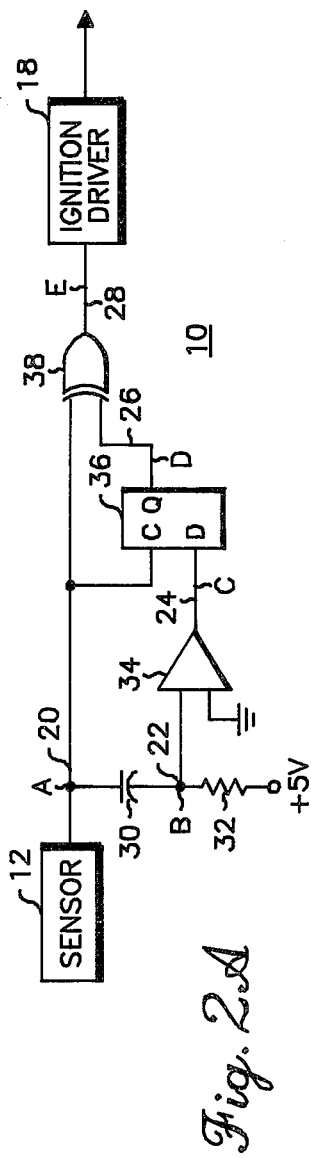
FIG. 2A is a more detailed schematic representation of a portion of the speed dependent ignition controller of FIG. 1A.

With reference to FIG. 1A, a simplified block diagram of a speed dependent ignition controller 10 in accordance with the present invention is shown. Speed dependent ignition controller 10 comprises in pertinent part a sensor 12 having as an output a signal "A" which is thereafter applied to a speed detector 14 and controlled signal inverter 16. The output of speed detector 14 is likewise applied to another input of controlled inverter 16. The output of controlled inverter 16 is a dwell control signal "E" which is then applied through an ignition driver 18 for operation of an internal combustion ignition system. The ignition driver 18 is just a power amplifier stage, such as a Darlington transistor pair which controls the current to an ignition coil, or it can be any other control circuit which uses the transitions of the dwell control signal "E" to control spark occurrence and/or dwell initiation.

Referring additionally now to FIG. 1B, the output signal "A" of sensor 12 is shown. This signal has a pulse width proportional to the difference between a desired ignition advance and retard angle. In the embodiment shown, the signals "A" and "E" comprise digital signals having a logic swing of between 0 and +5 volts. It should be noted that the timing diagram of FIG. 1B is plotted with respect to crankshaft angle. For purposes of analysis, the +5 volt level output of signal "E" will correspond to a "points-closed" position indicating the flow of ignition coil excitation current, while the 0 volt output level will correspond to a "points-open" position indicating the termination of ignition coil excitation current. Sensor 12 may be conveniently furnished as a Hall effect sensor or a reluctance or other magnetic sensor or the like and suitable waveform conditioning circuitry to provide the signal "A". For low engine speeds the dwell control signal "E" has a high to low transition (ends) at the retard crankshaft angle position R indicating the termination of dwell current and the occurrence of spark, while at high speeds the dwell control signal ends at the advance crankshaft position angle A. At low speeds signal "E" initiates dwell at position A, while at high speeds dwell starts at position R.

FIG. 1B relates the signal output of sensor 12 to a corresponding dwell control signal output "E" from controlled inverter 16 during both low and high rpm modes of engine operation. It can be seen, that during low rpm operation, the output of sensor 12 is inverted such that a dwell time corresponding to a minimum dwell angle is provided while spark is retarded. In the high rpm mode of operation the equivalent dwell time corresponds to a longer, maximum dwell angle utilizing the output of sensor 12 in a non-inverted condition while spark is advanced.

Figure 2B:
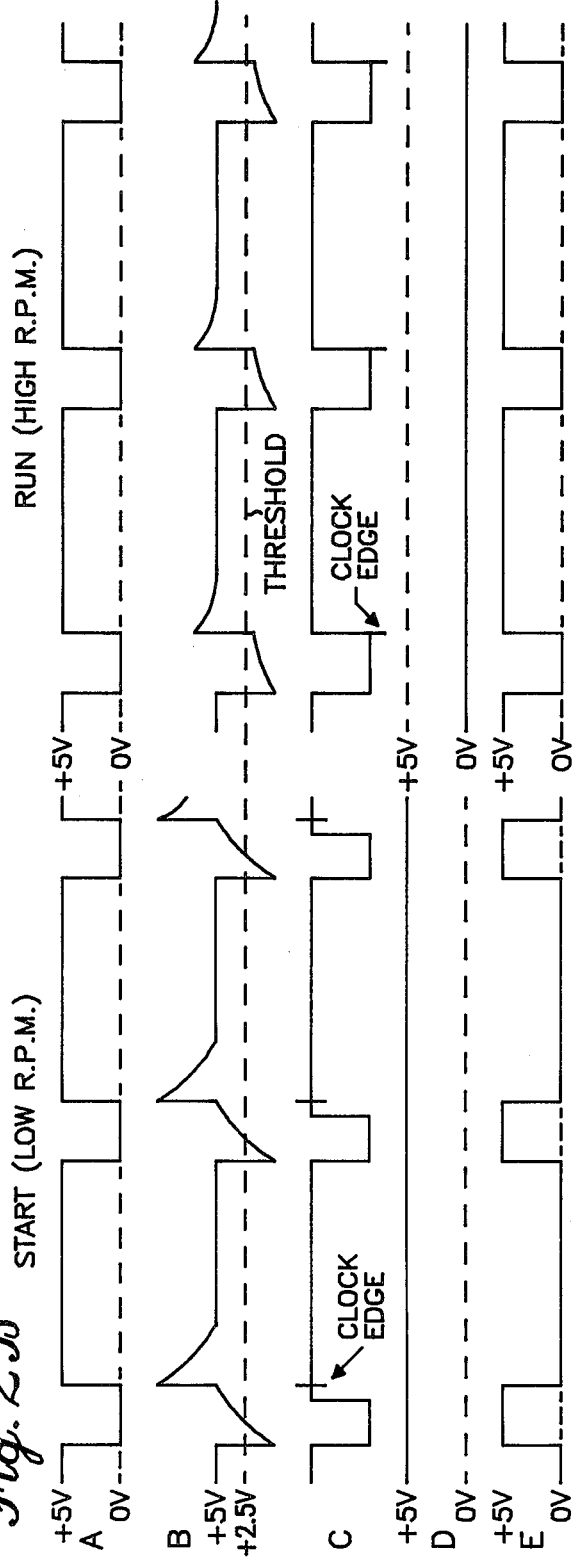
FIG. 2B is a relative timing diagram in relation to crankshaft angle for the speed dependent ignition controller of FIG. 2A illustrating the signals appearing at the like labeled portions of that circuit.

Referring additionally now to FIGS. 2A and 2B, a more detailed schematic illustration of a speed dependent ignition controller 10 in accordance with the present invention is shown. The output of sensor 12 appearing on sensor signal line 20 is again illustrated as the timing diagram signal "A". Sensor signal line 20 connects the output of sensor 12 to one terminal of capacitor 30 forming a differentiating circuit in combination with resistor 32 having its other terminal connected to a positive 5 volt source. Threshold input line 22 applies the differentiated output of sensor 12 appearing on sensor signal line 20 to one input of an effective threshold comparator 34 having its other input connected to circuit ground. The differentiated signal appearing on threshold input line 22 is illustrated as timing signal "B". Since threshold comparator 34 is preferably constructed using a CMOS exclusive OR gate, this connection makes it into a non-inverting comparator with an effective threshold of approximately one-half of supply voltage. Since the supply voltage is 5 volts the effective threshold level is 2.5 volts.

The output of threshold comparator 34 appears on data line 24 for input to the data terminal of flip flop 36. The signal appearing on data line 24 is illustrated as timing signal "C". Flip flop 36 has its clocking input connected to sensor signal line 20 for clocking through the signal on data line 24 on the occurrence of a positive going edge signal on sensor signal line 20. The Q output of flip flop 36 appears on Q output line 26 which is illustrated as the signal of timing diagram "D". Q output line 26 is connected to one input of exclusive OR gate 38 having its other input connected to sensor signal line 20. The output of exclusive OR gate 38 appears on dwell line 28. The signal appearing on dwell line 28 is shown in the timing diagram as signal "E" and corresponds to the dwell control signal above described with respect to FIGS. 1A and 1B. Dwell line 28 is thereafter applied to an input of an ignition driver 18 for subsequent operation of an engine ignition system. Ignition driver 18 may comprise a conventional transistor output stage.

In a preferred embodiment, capacitor 30 may have a value of 0.22 microfarads, and resistor 32 a value of 220K ohms. The effective threshold comparator 34 and exclusive OR gate 38 may each be ¼ of a Motorola Inc. MC14070B CMOS IC. Flip flop 36 may be ½ of an MC14013B CMOS IC.

With particular attention to FIG. 2B, the timing diagrams illustrate the signals appearing at the stated positions of the circuitry of FIG. 2A for both a low rpm and high rpm mode of operation. All signals illustrated in FIG. 2B are with respect to engine crankshaft angle.

During the low rpm operation of an engine, particularly startup, the signal appearing at the output of sensor 12 (signal "A") is differentiated to that shown as signal "B". Utilizing the circuitry above described, an effective threshold of approximately 2½ volts is established for comparator 34 which corresponds to a predetermined engine threshold speed, and as shown, the signal appearing on threshold input line 22 will cross this threshold prior to the points closure indicated by a positive transition of the signal "A". Thus, the signal "C" appearing at 24 reaches a high level prior to the positive transition of the signal "A". Thus, this high signal level at 24 will be transferred to the Q output of flip flop 36 at 26 and determine signal "D". Signal "D" appearing on Q output line 26 is then applied to one input of exclusive OR gate 38 causing an inversion of the signal appearing on its other input to appear at its output on dwell line 28 indicated by signal "E". Thus, a retarded spark occurrence with a minimum dwell angle is established.

During a high rpm mode of operation, the signal appearing at "B" does not cross the threshold prior to the positive going transition of the output of sensor 12 appearing on sensor signal line 20. Thus, a low signal level appears on data line 24 at the time of the positive going transition of signal "A". Therefore, a low signal level in turn appears on Q output line 26 indicated as signal "D". This low signal level is applied to exclusive OR gate 38 having its other input connected to sensor signal line 20. Thus, the low signal level on Q output line 26 does not invert signal "A" causing a like signal to appear at "E". In this manner, an advanced spark occurrence and maximum dwell angle is established during the high rpm mode of operation.

In operation, it should be noted that the ratio of points closure to points opening (the remaining period) of sensor 12 (the ratio of the signal "A" +5 volt pulse width to the signal "A" 0 volt pulse width) is approximately four to one. As sustained engine operations are generally at a high rpm mode as opposed to a low rpm mode, the establishment of a proper advance angle is therefore more critical than that of the retard angle.

While there have been described above the principles of the invention in conjunction with specific apparatus, it is to be clearly understood that this description is made only by way of example and not as a limitation to the scope of the invention. While preferably the ignition driver 18 is just a transistor stage which directly drives the ignition coil, other more complex circuits could be used which would separately determine dwell (or spark) initiation but still rely on sensor signal inversion as a function of engine speed to switch between using advance or retard sensor signal transitions to determine spark and/or dwell initiation.

I claim:

1. A speed dependent ignition timing controller for an internal combustion engine comprising:
    a sensor coupled to said engine for generating a sensor signal having a pulse width proportional to a difference between a desired ignition advance and retard angle;
    an engine speed detector coupled to said sensor for developing first and second threshold signals when said sensor signal is representative of an engine speed less than and greater than a threshold engine speed respectively; and
    a speed dependent signal inverter coupled to said sensor and said engine speed detector for providing a dwell control signal by selectively inverting said sensor signal in response to said first and second threshold signals, said dwell control signal adaptable for controlling the initiation of at least one of dwell and spark
    whereby said dwell control signal ends at said retard angle when said first threshold signal is present and ends at said advance angle when said second threshold signal is present.

2. The controller of claim 1 wherein said sensor is a Hall effect sensor.

3. The controller of claim 1 wherein said sensor is a magnetic sensor and waveform conditioning circuit.

4. The controller of claim 1 wherein said speed detector comprises a comparator and a flip flop.

5. The controller of claim 1 wherein said speed dependent inverter is an exclusive OR gate.

6. The controller of claim 1 wherein said sensor signal is a digital signal and the ratio of said pulse width to the remaining period of said signal is approximately 4:1.

7. The controller of claim 1 wherein said pulse width starts at said advance angle and ends at said retard angle and which includes an ignition driver for receiving said dwell control signal and controlling spark/dwell, wherein a transition in said dwell control signal determines spark occurrence at said retard angle when said first threshold signal is present and a transition in said dwell control signal determines spark occurrence at said advance angle when said second threshold signal is present.

8. The controller of claim 7 wherein said driver responds to a transition in said dwell control signal to initiate dwell at said advance angle when said first threshold signal is present and initiates dwell at said retard angle when said second threshold signal is present.

9. A method for controlling the ignition timing of an internal combustion engine comprising the steps of:
    generating a sensor signal having a pulse width proportional to a difference between a desired ignition advance and retard angle;
    developing in response to said sensor signal a first threshold signal when said sensor signal is representative of an engine speed less than a threshold engine speed and a second threshold signal when said sensor signal is representative of an engine speed greater than said threshold engine speed; and
    producing a first dwell signal which ends at said retard angle when said first threshold and sensor signals are present and a second dwell signal which ends at said advance angle when said second threshold and sensor signals are present.

10. The method of claim 9 wherein said step of generating is carried out by means of a Hall effect sensor.

11. The method of claim 9 wherein said step of generating is carried out by means of a magnetic sensor and waveform conditioning circuit.

12. The method of claim 9 wherein said step of developing is carried out by means of a differentiator and a comparator.

13. The method of claim 12 wherein said step of developing is additionally carried out by means of a flip flop.

14. The method of claim 9 wherein said step of producing is carried out by means of a controlled signal inverter.

15. A method for controlling the ignition timing of an internal combustion engine in relation to engine speed comprising the steps of:
    generating a sensor signal having a pulse width proportional to a difference between first and second ignition angles;
    utilizing said sensor signal to produce a first dwell signal when said engine speed bears a first relation to a predetermined threshold engine speed; and
    inverting said sensor signal to produce a second dwell signal when said engine speed bears a second opposite relation to said predetermined threshold engine speed.

16. The method of claim 15 wherein said step of generating is carried out by a Hall effect sensor.

17. The method of claim 15 wherein said step of generating is carried out by means of a magnetic sensor and waveform conditioning circuit.

18. The method of claim 15 wherein said step of utilizing is carried out by means of a differentiator and a comparator.

19. The method of claim 18 wherein said step of utilizing is additionally carried out by means of a flip flop.

20. The method of claim 15 wherein said step of inverting is carried out by means of a controlled inverter.

* * * * *